US006193609B1

United States Patent
D'Achard Van Enschut

(10) Patent No.: US 6,193,609 B1
(45) Date of Patent: Feb. 27, 2001

(54) HAND HELD CONTROL UNIT FOR CONTROLLING A DISPLAY SCREEN-ORIENTED COMPUTER GAME, AND A DISPLAY SCREEN-ORIENTED COMPUTER GAME HAVING ONE OR MORE SUCH CONTROL UNITS

(75) Inventor: Johannes F. M. D'Achard Van Enschut, Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 08/823,577

(22) Filed: Mar. 25, 1997

(30) Foreign Application Priority Data

Apr. 3, 1996 (EP) ................................. 96200904

(51) Int. Cl.[7] ...................................................... A63F 9/22
(52) U.S. Cl. ........................................ 463/37; 273/148 B
(58) Field of Search ........................... 273/148 B, 148 R; 463/36, 37, 46, 47; 345/156, 168, 173

(56) References Cited

U.S. PATENT DOCUMENTS

| D. 261,402 | * | 10/1981 | Lovejoy | D21/13 |
|---|---|---|---|---|
| 4,359,222 | * | 11/1982 | Smith, III et al. | 463/37 |
| 4,540,176 | * | 9/1985 | Baer | 463/37 |
| 5,088,928 | * | 2/1992 | Chan | 434/339 |
| 5,312,114 | * | 5/1994 | Lipson | 463/35 |
| 5,393,072 | * | 2/1995 | Best | 463/37 |
| 5,645,277 | * | 7/1997 | Cheng | 273/148 B |
| 5,759,100 | * | 6/1998 | Nakanishi | 463/37 |
| 5,766,077 | * | 6/1998 | Hongo | 463/30 |
| 5,796,388 | * | 8/1998 | Yasuhara et al. | 345/168 |
| 5,853,327 | * | 12/1998 | Gilboa | 463/39 |
| 5,976,018 | * | 11/1999 | Druckman | 463/47 |

FOREIGN PATENT DOCUMENTS

0679986A1   11/1995  (EP) .
06285259  * 10/1994  (JP) ................................. 463/36

OTHER PUBLICATIONS

Copy of translation of Japanese Kokai Patent Application No. Hei 6[Oct. 1994]–285259 to Murata, previously of record.*

* cited by examiner

Primary Examiner—Jessica J. Harrison
(74) Attorney, Agent, or Firm—Brian J. Wieghaus

(57) ABSTRACT

A hand-held control unit is used to control a display screen-oriented computer game. The unit comprises a housing with a front side, a set of control members lying generally flush with the front side for through actuating thereof controlling actions of in-game display items, and an output for communicating representative signals of the actuating to the computer for controlling game actions displayed on the display screen. The control unit has at the front side a representation of an associated game item which generally coincides with one or more of the control members that are thereby functionally integrated with the representation.

14 Claims, 4 Drawing Sheets

HAND HELD CONTROL UNIT FOR CONTROLLING A DISPLAY SCREEN-ORIENTED COMPUTER GAME, AND A DISPLAY SCREEN-ORIENTED COMPUTER GAME HAVING ONE OR MORE SUCH CONTROL UNITS

BACKGROUND TO THE INVENTION

The invention relates to a hand-held control unit for generating control signals for a display screen-oriented computer game, said control unit comprising:
- a housing with a front side;
- a set of control members lying generally flush with said front side for through actuating thereof, controlling actions of in-game display items;
- output means for communicating representative signals of said actuating to said computer,
- for controlling display screen means for displaying said actions within said game. A control unit of this kind has been disclosed in EP 679 986 A1 to SEGA Enterprises. Such a game can be played with one or more persons, and the display is generally of the raster scan type. Alternatively, a preconfigured LCD screen can be used. The game is often merchandised on an appropriate medium, such as a tape cartridge, a floppy disc, or a CD-I or CD-ROM optical disc. Another possibility is to load the game from a distant source, such as by broadcast or cable means. Typical games depend on the skill of players to dynamically control items that move in the game, or to solve logical problems that are posed explicitly or implicitly. The platform for playing the game can for example be a CD-I or CD-ROM machine or a personal computer, that can interface to the control unit, which may have a particular shape that is ergonomically feasible. Various such units are being marketed, although also keyboards of the Querty or similar type are being used. In case of a preconfigured LCD screen, present day games usually have all control members integrated with the display in a single housing.

The present inventor has recognized the uniformity of the control units in that they do not depend on the actual game, although they may strongly depend on the type of platform. Other control units may be specific for a whole category of games, such as a control unit for aeroplane-related games that comes with a joystick, or a control unit for a racing car-related game, that comes with a steering wheel. Generally, the control units considered by the present invention are of a more elementary character, however. Generally, for a particular platform, a limited set of control members such as buttons, may have widely varying functions over respective games. In consequence, making the control units game-specific would let users, in particular children of pre-school or kindergarten age that cannot read, more easily recognize the functions that a particular control unit may have for controlling the characters or other items of the associated game.

FIELD OF THE INVENTION

Therefore, amongst other things, it is an object of the present invention to provide game-specific control units that can be made user-friendly through providing an organization that is instructive as well as easy manipulatable, for so enabling a user, in particular a child, to quickly and easily befriending the game in question. Now, according to one of its aspects, the invention is characterized in that said control unit has at said front side a representation of an associated game item which generally coincides with one or more said control members that are thereby functionally integrated with said representation. The more or less flat dimensioning of the front side of the control unit allows easy manufacturing, while the representation of the game character or item -such as a person, an animal, or a representation of a lifeless thing like an aeroplane-lends more activity to the game. The control unit itself may be based on a soft keyboard, such as realized in a touch screen, or with hard keys or similar control members that respond in a manner known therefor. They may thus be mechanically actuatable, capacitive or inductive keys, or other as necessary. For example, if applicable, a tracker ball feature may be realized in the control unit.

Advantageously, the screen is a video screen, and the representation is a covering flexible layer on top of said control members that are pressure sensitive. This embodiment has been considered a prime target for merchandising, although various other technologies could be used as well.

Advantageously, the unit has a display screen for reversibly displaying said representation, and said control members being implemented as various locations of said display screen that is a touch sensitive display screen. This enhances flexibility, while the unit may still remain low cost.

Advantageously, said representation comprises a control member located in conformity with a particular part of a display item representation, which primarily controls an action of that particular part while being in-game displayed. The conformity can mean that the representation has various extremities, and the control members are likewise positioned in a configuration that corresponds to these extremities, for example: up, down, left, right, center. The representation may be colocated with the control members, or rather, a shift, rotation or change-of-size between the representation and the configuration of the control members may have been effected. A control member that is positioned in conformity with a particular part of the representation on the control unit may control a corresponding part of the on-screen representation. For example, the top control member may control head movements of a character person, or a bottom control member may control a foot for executing a jumping motion.

Advantageously, the control unit may have cointegrated cursor keys for allowing very flexible controlling. Such cursor may immediately control a position and/or rather a direction of motion of an in-game item. Advantageously, the control unit has a detachable electronic interface to said computer, provided with identifier code signalling means towards said computer. This allows to play various games in sequence, while the successive activation of these games can be rendered automatically. By itself, automatic self-identification of electronic items to a computer in a test environment has been disclosed in U.S. Pat. No. 4,074,189 to the present assignee.

The invention also relates to a housing for therein detacheably embedding a unit as recited supra, therewith electrically mapping on electric interface of the unit so embedded.

The invention also relates to a video display computer game executed with a plurality of characters of which one or more are assigned to associated and specifically organized control units as described above. Various further advantageous aspects of the invention are recited in dependent Claims.

BRIEF DESCRIPTION OF THE DRAWING

These and other objects and advantages of the invention will be discussed more in detail with reference to the disclosure of preferred embodiments hereinafter, and in particular with reference to the appended Figures that show.

DETAILED DISCLOSURE OF PREFERRED EMBODIMENTS

Figure 1:
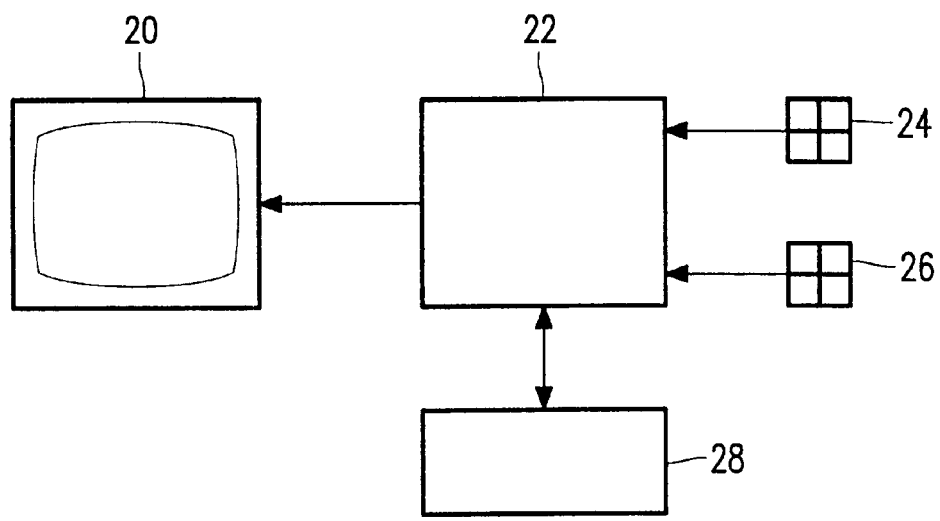
FIG. 1, an overall block diagram of a game.

FIG. 1 is an overall block diagram of a video display computer game as an embodiment of a display screen-oriented computer game that has been enhanced according to the invention. Block 20 is a conventional raster scan display, such as based on a Cathode Ray Tube. Display signals are communicated by control computer 22 in accordance with control signals from the user computer program and in accordance with user-actuation input signals. The video game computer program may be presented through external memory 28, that may be in any appropriate form and capacity, such as a RAM Module. The associated electromechanical interface has been suppressed for brevity. Items 24, 26 are hand-held control units in accordance with the present invention. As shown, these have at least four control buttons each, that may be active or not, depending on the particular computer game. As will be discussed hereinafter, additional cursor control may be provided as well. During the game, actuating a particular button effects a selective action of one or more on-screen items, such as moving, fencing, shooting, jumping in pseudo three-dimensional space, etcetera. It is not necessary that for each game, or for a particular game during every phase thereof, all four buttons are active.

The embodiments may be diverse: the screen may be a preconfigured LCD screen that has game characters prepared at various screen positions. Motion of a character or other game item can then be realized by activating a succession of these positions. The program may wholly or partly be loaded from a distant central station. The game may be played by more than one person at respective different geographical locations, in such a way as having competition or cooperation between them. The game may be playable by only a single person.

Figure 2:
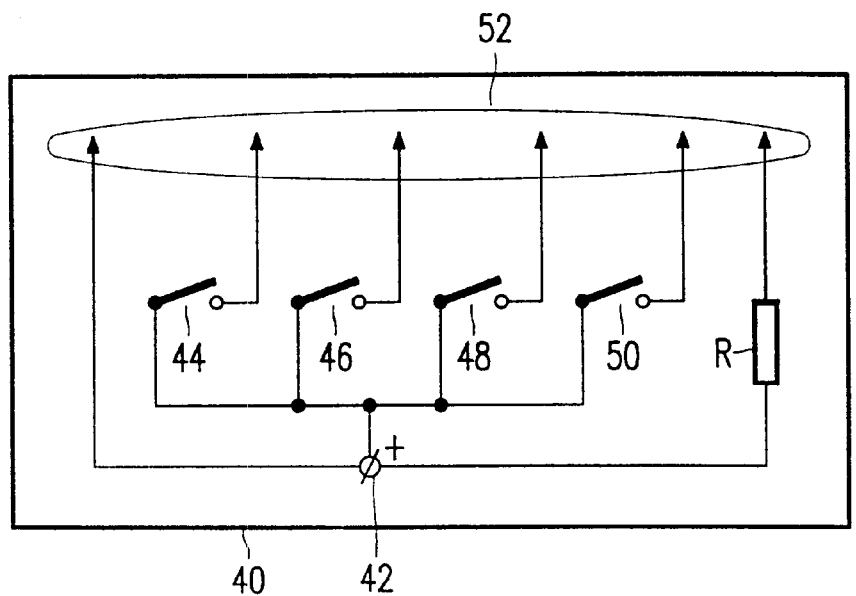
FIG. 2, a block diagram of a control unit according to the invention.

FIG. 2 is a block diagram of a control unit according to the invention. Housing 40 is through a multiple-line cable interface 52 connected to the computer proper not shown. Positive terminal 42 through closure of any one or more of pressure-activated switches 44–50 can present a positive potential on the associated signal output line(s). The presentation of these signals may require additional, but standard electronic circuitry. In general, the control unit will contain minimal, or even no electronics at all to keep the associated cost low. This allows ergonomic shaping and optimising for the target group that may include kindergarten children, or rather senior citizens that have little computer knowledge. The action buttons may have the shape of the associated action figure; in particular, also cursor control may be provided. The action buttons, or rather their locations, may have distinctive colors, may have shallow profiles, and may be integrated in preferably a conductive rubber mat. An alternative is to manufacture the action figure out of hard plastic and position it on top of a rubber mat that contains the switching elements. A particular control unit may be provided with self-identifier means, such as a resistance value of resistor R, or a set of resistance values that can be interrogated by the computer. The thickness of the overall control unit may amount to a few millimeters only, the cross-section may be some 100 millimeters, so that the control unit can be described as having a substantially flat body.

An alternative to the above is to have wireless signal transfer from the control unit to the computer, such as by infra-red, radio-frequency, ultrasound, or the like. In that case the control unit will contain a small microcontroller, transmitter electronics, and a powering battery. A still further realization of the control unit has a relatively small display screen and soft keyboard integrated therein. In such case, the appropriate game character is displayed on the screen, such as by preconfiguration thereof. This means that even during the game, the shape, position and/or identity of the in-game item to be controlled can be changed.

Figure 3A:
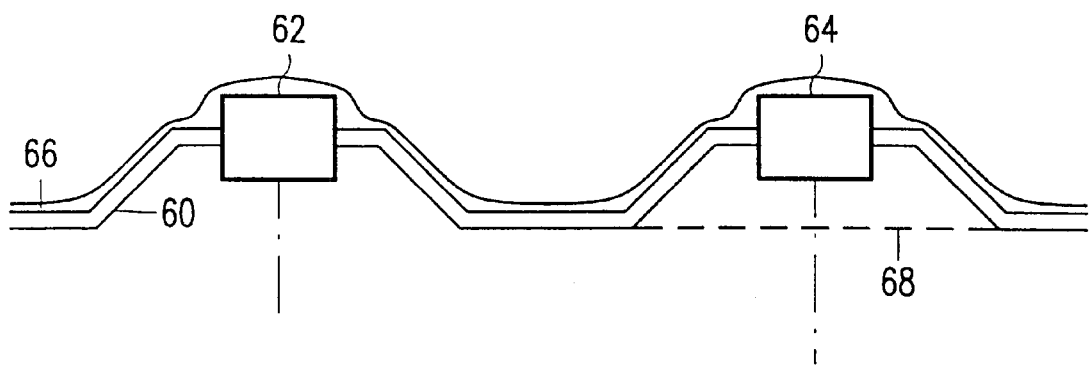
FIG. 3A, a cross section thereof.

FIG. 3A is a cross section of a control unit according to the invention, that has been realized through using a foil-based keyboard. Herein, items 62, 64 are discs made from electrically conductive rubber. For example, they may have a diameter of 2 millimeters, and a height of 1 millimeter. They are embedded in a non-conductive flexible foil of plastic or rubber of about 1 millimeter thickness. Layer 66 may be a layer that is flexible as well, and has a game-related picture provided thereon, such as will be discussed more in detail hereinafter. Through a finger pushing on the location of the conductive disc, the foil may be depressed down to the plane indicated by 68, which may be the location of a plate with conductive tracks thereon.

Figure 3B:
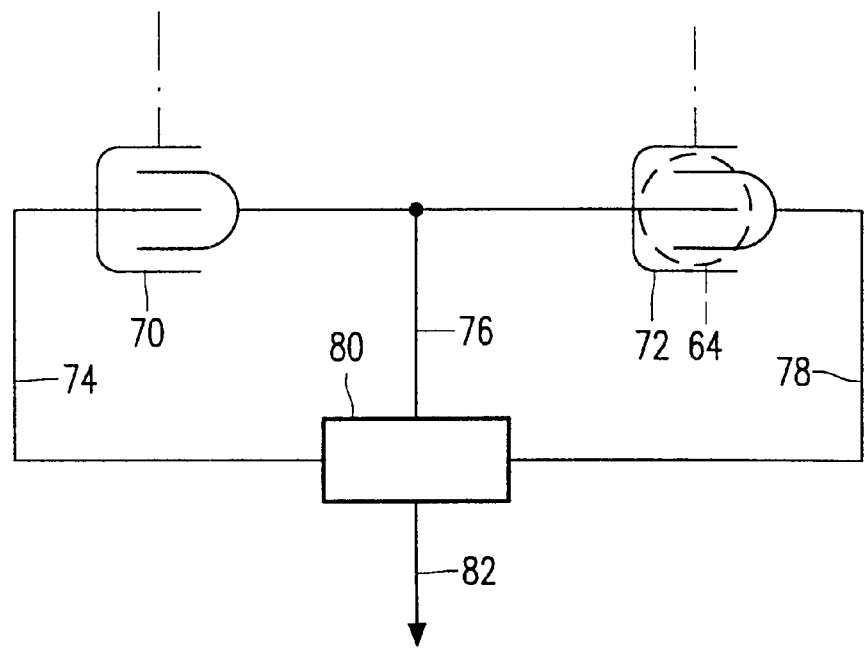
FIG. 3B, an electronic realization thereof.

A top view of such plate, and the associated electronic realization has been shown in FIG. 3B. Structures 70, 72 are located below the conductive rubber discs of FIG. 3A, in such a way that depressing the disc as symbolized by circle 64, will close the electric contact contained in these structures. The closing or not will be detected in decoder 80 that via interconnections 74, 76, 78 is connected to these contacts. The decoder will send an associated signal on line 82 to the computer. To this effect, the decoder may convert the signals received to an appropriate binary code that is transmitted as a serial bit stream. Decoding may be by diode matrix. For brevity, further electronic facilities will not be discussed in detail.

Figure 4:
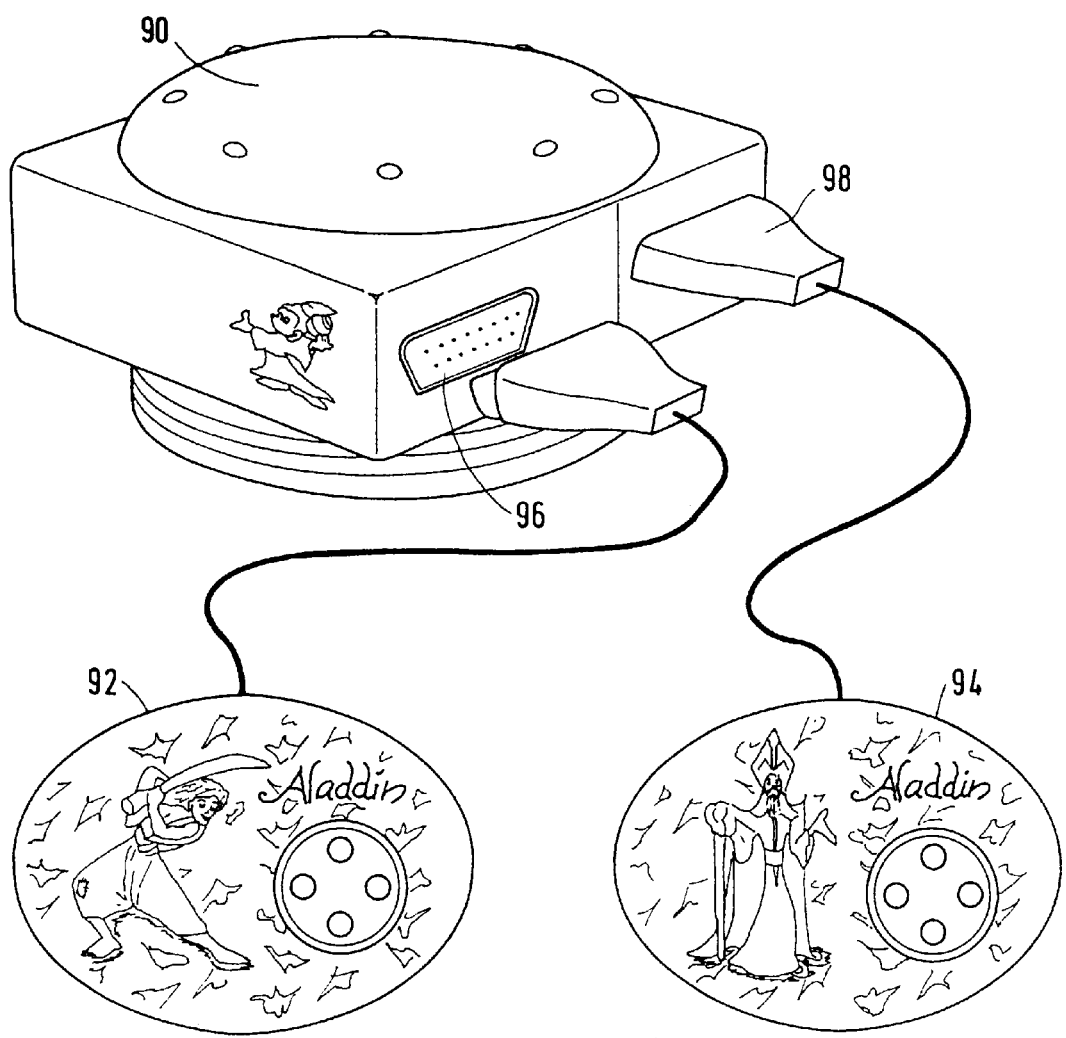
FIG. 4, a visual impression of a video game interface.

FIG. 4 is a visual impression of a video game interface. First, the top device 90 allows to attach one or more control units in exactly the same manner as a standard computer keyboard. To this effect, the device has a keyboard output at its rear side not shown, which can be connected directly into the keyboard port that is generally provided with personal computers and the like. Internally in the device, signals received are translated into standard keyboard key format. At its front side, device 90 has two female plugs for interconnecting to two or more respective control units according to the invention, of which plug 96 has been shown unconnected. The second plug has been shown with a corresponding control unit plug 98 inserted. In fact, the two plugs may have their attachment positions interchanged. If the bit width of the signalling from the control units is lower, a more narrow plug interface can be used. At the side of the control unit, the cable may be permanently attached. A preferred solution however, is to have there a separable plug of standard dimensions. In this way, the control units may be stacked in a container specially designed therefor. In future embodiments, device 90 will probably interface through a universal serial bus USB.

In the arrangement shown, the computer game derives from the well-known "ALADDIN" movie, copyright WALT DISNEY COMPANY. The two control units each carry a representation of an associated game character, and furthermore, a set of four button representations in a visual configuration that corresponds to a cursor mechanism. These representations of cursor and game character are integrated in a covering flexible layer on the top of the control unit. The game character representations cover further control members.

Figure 5:
FIG. 5, a further realization of a control unit.

FIG. 5 is a further example of Such a control unit, along the general lines of construction as FIGS. 3, 4 but associated with a different movie "LION KING", also copyright WALT DISNEY COMPANY.

Figure 6A:
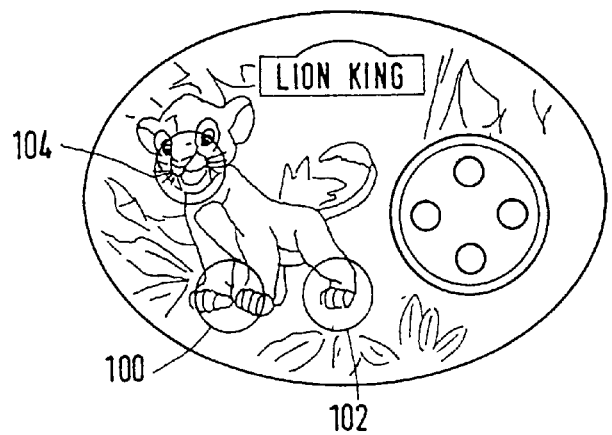
FIGS. 6A–6C, electromechanical organizations of control units.
Figure 6B:
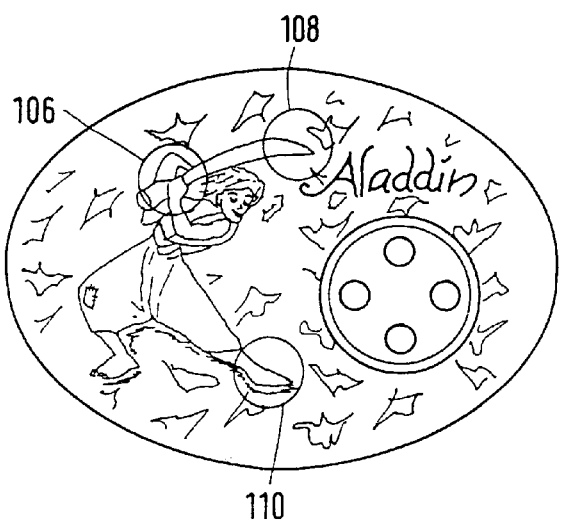

FIGS. 6A, 6B show electrical organizations of control units. The representations of the game characters are the same as in the preceding Figures. Additional control signals for the game are generated in that circles 100–110 indicate the positions of further actuation members, that however are obscured by the representations on the front side of the units. In FIG. 6A, member 104 may control giving of an audible snarl, member 100 may control walking, member 100 may control jumping by the character depicted. In FIG. 6B, member 108 may control movement of a sword, member 110 may control jumping, member 106 may control some other movement by the person or character depicted. All actuation members lie generally flush with the front side of the control unit; small protrusions of a few millimeters may be used to render the positions of the members found more easily. One possible realization is through a shallow relief in the surface of the covering layer that carries the representations.If applicable, a tracker ball feature may be added to the control unit.

Figure 6C:
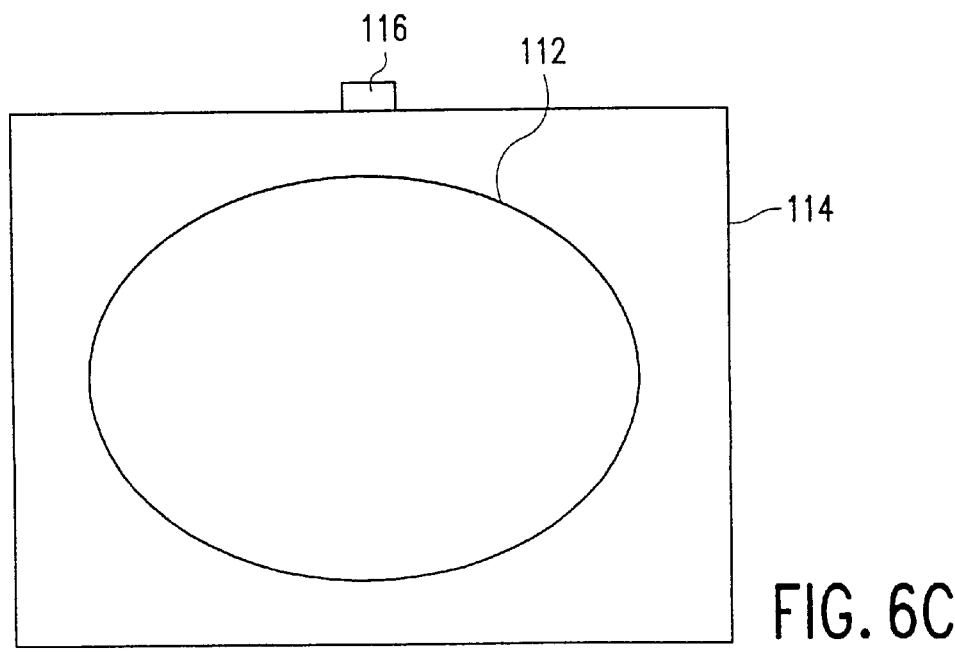

FIG. 6C shows a further electromechanical organization of a control unit. The control unit itself 112 again has the shape of a round or elliptical body with generally front side and rear side. It has been detacheably embedded in a housing 114 that may have a rectangular, elliptical, or circular shape. When embedded, the electric interface of the control unit connects to corresponding electric contacts of the housing. Then the interface is effectively 1:1 mapped on electric plug 116 that may be connected to concentrator device 90 shown in FIG. 4. It has been found that the larger size of housing 114 is more easy to handle for certain categories of players such as very young children.

What is claimed is:

1. A hand-held control unit for enabling a user to control at least one object displayed on a display device of a computer game system while playing a specific computer game that incorporates the at least one object, the control unit comprising:

a housing;

a graphical representation of the at least one object disposed proximate to a surface of the housing;

at least one control member lying substantially flush with said surface and actuatable by the user externally of the housing to generate at least one control signal that is utilized by the computer game system to control the at least one object, wherein the at least one control member is positioned proximate to a specific part(s) of the graphical representation of the at least one object that the user can control by actuating the at least one control member; and a flexible layer covering the surface of the housing, wherein the graphical representation is applied to the flexible layer.

2. The hand-held control unit as set forth in claim 1, wherein the flexible layer overlays the at least one control member.

3. The hand-held control unit as set forth in claim 2, wherein the at least one control member forms a shallow relief in the flexible layer.

4. The hand-held control unit as set forth in claim 2, wherein the at least one control member protrudes through at least one respective opening formed in the flexible layer.

5. The hand-held control unit as set forth in claim 1, wherein the at least one control member is concealed by the flexible layer.

6. The hand-held control unit as set forth in claim 1, wherein the at least one control member is positioned relative to the graphical representation in such a manner as to visually indicate to the user the specific part(s) of the at least one object that the user can control by actuating the at least one control member.

7. The hand-held control unit as set forth in claim 1, wherein the surface of the housing is substantially flat.

8. A hand-held control unit for enabling a user to control an object displayed on a display device of a computer game system while playing a specific computer game that incorporates the object, the control unit comprising:

a housing;

a graphical representation of the object disposed proximate to a surface of the housing;

a plurality of control members lying substantially flush with said surface and actuatable by the user externally of the housing to generate control signals that are utilized by the computer game system to control the object, wherein the plurality of control members are positioned proximate to respective specific part(s) of the graphical representation of the object that the user can control by actuating the at least one control member; and a flexible layer covering the surface of the housing, wherein the graphical representation is applied to the flexible layer.

9. The hand-held control unit as set forth in claim 8, wherein the flexible layer overlays the at least one control member.

10. The hand-held control unit as set forth in claim 9, wherein each of the plurality of control members forms a respective shallow relief in the flexible layer.

11. The hand-held control unit as set forth in claim 9, wherein the at least one control member protrudes through at least one respective opening formed in the flexible layer.

12. The hand-held control unit as set forth in claim 8, wherein the plurality of control members are concealed by the flexible layer.

13. The hand-held control unit as set forth in claim 8, wherein the plurality of control members are positioned relative to the graphical representation in such a manner as to visually indicate to the user the specific parts of the object that the user can control by actuating the respective ones of the plurality of control members.

14. The hand-held control unit as set forth in claim 8, wherein the surface of the housing is substantially flat.

* * * * *